(12) United States Patent
Tanner

(10) Patent No.: US 11,350,179 B2
(45) Date of Patent: *May 31, 2022

(54) BANDWIDTH EFFICIENT MULTIPLE USER PANORAMIC VIDEO STREAM DELIVERY SYSTEM AND METHOD

(71) Applicant: Altia Systems, Inc., Cupertino, CA (US)

(72) Inventor: Jason Daniel Tanner, Folsom, CA (US)

(73) Assignee: GN AUDIO A/S

( * ) Notice: Subject to any disclaimer, the term of this patent is extended or adjusted under 35 U.S.C. 154(b) by 182 days.

This patent is subject to a terminal disclaimer.

(21) Appl. No.: 16/899,867

(22) Filed: Jun. 12, 2020

(65) Prior Publication Data

US 2020/0314502 A1 Oct. 1, 2020

Related U.S. Application Data

(63) Continuation of application No. 16/409,887, filed on May 13, 2019, now Pat. No. 10,721,537, which is a
(Continued)

(51) Int. Cl.
*G06F 15/16* (2006.01)
*H04N 21/637* (2011.01)
*H04N 5/232* (2006.01)
*H04N 17/00* (2006.01)
*H04N 5/262* (2006.01)
*H04N 5/247* (2006.01)
(Continued)

(52) U.S. Cl.
CPC .......... *H04N 21/637* (2013.01); *G01B 11/22* (2013.01); *H04N 5/23219* (2013.01); *H04N 5/23238* (2013.01); *H04N 5/247* (2013.01); *H04N 5/265* (2013.01); *H04N 5/2624* (2013.01); *H04N 17/002* (2013.01); *H04N 21/238* (2013.01)

(58) Field of Classification Search
CPC .... G01B 11/22; H04N 17/002; H04N 21/238; H04N 21/637; H04N 5/23219; H04N 5/23238; H04N 5/247; H04N 5/2624; H04N 5/265
See application file for complete search history.

(56) References Cited

U.S. PATENT DOCUMENTS 6,559,846 B1 5/2003 Uyttendaele et al.
6,728,775 B1 4/2004 Chaddha
(Continued)

OTHER PUBLICATIONS

Toon De Pessemier, Luc Martens, Wout Joseph, Dynamic Optimization of the Quality of Experience during Mobile Video Watching , pp. 1-6. ( Year :2015).

*Primary Examiner* — Chris Parry
*Assistant Examiner* — Dixon F Dabipi
(74) *Attorney, Agent, or Firm* — HM Law Group LLP; Vani Moodley, Esq.

(57) ABSTRACT

A computer-implemented method for transmitting a panoramic video from a source to a plurality of video receivers is provided. The method comprises receiving panoramic video from a camera corresponding to a scene being imaged; transmitting the panoramic video as a plurality of video streams, each to one of the plurality of video receivers; receiving feedback information from the plurality of video receivers; performing an optimization operation to optimize the panoramic video being transmitted based on the feedback information received from each of the plurality of video receivers.

17 Claims, 9 Drawing Sheets

Related U.S. Application Data continuation of application No. 13/902,779, filed on May 24, 2013, now Pat. No. 10,341,743.

(51) Int. Cl.
*G01B 11/22* (2006.01)
*H04N 5/265* (2006.01)
*H04N 21/238* (2011.01)

(56) References Cited

U.S. PATENT DOCUMENTS

| | | |
|---|---|---|
| 8,351,513 B2 | 1/2013 | Wen et al. |
| 9,736,367 B1 | 8/2017 | Alam et al. |
| 2002/0015042 A1 | 2/2002 | Robotham |
| 2005/0216951 A1 | 9/2005 | MacInnis |
| 2007/0006080 A1 | 1/2007 | Finger et al. |
| 2007/0067373 A1 | 3/2007 | Higgins et al. |
| 2008/0313278 A1 | 12/2008 | Hochberg |
| 2009/0201313 A1 | 8/2009 | Thorn |
| 2009/0204909 A1 | 8/2009 | Hornbaker |
| 2010/0226444 A1 | 9/2010 | Thevathasan et al. |
| 2010/0229210 A1 | 9/2010 | Sharp et al. |
| 2011/0032329 A1 | 2/2011 | Bauza et al. |
| 2011/0273436 A1 | 11/2011 | Vahtola |
| 2012/0203886 A1 | 8/2012 | Mavromatis |
| 2012/0271908 A1 | 10/2012 | Luna |
| 2012/0317299 A1 | 12/2012 | Sathianathan et al. |
| 2013/0208012 A1 | 8/2013 | Ergan |

User A receives the following stream based on frames 306 – 312 with the block in white indicating what is being displayed to the user. Note two frames are not sent because user A is running at a lower frame rate.

User B receives the following stream based on frames 306 – 312 with the block in white indicating what is being displayed to the user.

BANDWIDTH EFFICIENT MULTIPLE USER PANORAMIC VIDEO STREAM DELIVERY SYSTEM AND METHOD

This application claims the benefit of priority to U.S. patent application Ser. No. 16/409,887 filed on May 13, 2019, which is a continuation of U.S. patent application Ser. No. 13/902,779, which was filed on May 24, 2013, each of which is incorporated by reference herein in its entirety.

FIELD

Embodiments of the invention relate generally to video streaming of content.

BACKGROUND

Typically, videoconferencing may be transacted on a peer-to-peer basis where there are two viewers each setup to view a single stream provided by the other viewer. Skype provides an example of a peer-to-peer video conferencing service.

Videoconferencing may also be transacted on a multiparty basis in which N streams are provided to N viewers, as exemplified by services such as Google Hangout. With Google Hangout a current stream is selected from a plurality of different streams depending on who is talking. Alternatively, a user can select individual streams. But between the N streams that are delivered, nothing is individualized according to what each user is viewing.

SUMMARY

This Summary is provided to comply with 37 C.F.R. § 1.73, requiring a summary of the invention briefly indicating the nature and substance of the invention. It is submitted with the understanding that it will not be used to interpret or limit the scope or meaning of the claims.

In one aspect, a method for efficiently delivering a customized video stream corresponding to a scene to each of a plurality of viewers (video receivers) is disclosed. The method comprises receiving video from a camera corresponding to a scene being imaged; transmitting the video as a plurality of video streams, each to one of the plurality of video receivers; receiving feedback information from each of the plurality of video receivers; performing an optimization operation to optimize each of the plurality of video streams being transmitted based on the feedback information; wherein each optimized video stream is optimized for a particular video receiver based on the feedback information received for that video receiver.

Other aspects of the invention will be apparent from the detailed description below.

BRIEF DESCRIPTION OF THE DRAWINGS

In the following description, for purposes of explanation, numerous specific details are set forth in order to provide a thorough understanding of the invention. It will be apparent, however, to one skilled in the art that the invention can be practiced without these specific details. In other instances, structures and devices are shown in block diagram form only in order to avoid obscuring the invention.

The present invention, in accordance with one or more various embodiments, is described in detail with reference to the following figures. The drawings are provided for purposes of illustration only and merely depict exemplary embodiments of the invention. These drawings are provided to facilitate the reader's understanding of the invention and shall not be considered limiting of the breadth, scope, or applicability of the invention. It should be noted that for clarity and ease of illustration these drawings are not necessarily made to scale.

The figures are not intended to be exhaustive or to limit the invention to the precise form disclosed. It should be understood that the invention can be practiced with modification and alteration, and that the invention be limited only by the claims and the equivalents thereof.

DETAILED DESCRIPTION

In the following description, for purposes of explanation, numerous specific details are set forth in order to provide a thorough understanding of the invention. It will be apparent, however, to one skilled in the art that the invention can be practiced without these specific details. In other instances, structures and devices are shown in block diagram form only in order to avoid obscuring the invention.

Reference in this specification to "one embodiment" or "an embodiment" means that a particular feature, structure, or characteristic described in connection with the embodiment is included in at least one embodiment of the invention. The appearance of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

Moreover, although the following description contains many specifics for the purposes of illustration, anyone skilled in the art will appreciate that many variations and/or alterations to said details are within the scope of the present invention. Similarly, although many of the features of the present invention are described in terms of each other, or in conjunction with each other, one skilled in the art will appreciate that many of these features can be provided independently of other features. Accordingly, this description of the invention is set forth without any loss of generality to, and without imposing limitations upon, the invention.

Broadly, embodiments of the present invention disclose techniques and systems for efficiently delivering a customized video stream to each of a plurality of users.

Figure 1:
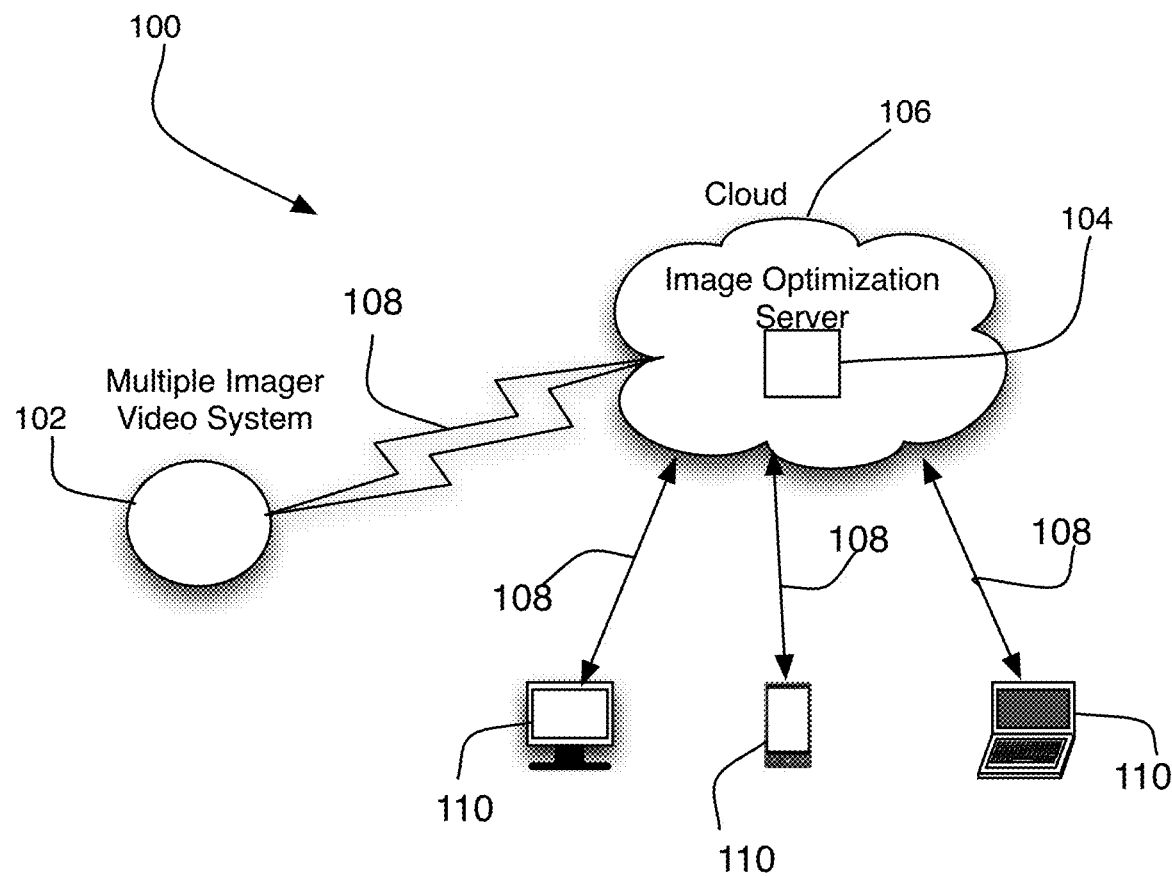
FIG. 1 shows a network environment within which embodiments of the invention may be practiced.

In one embodiment, a multiple imager video system (camera) 102 may be deployed in a network environment 100 as shown in FIG. 1. Referring to FIG. 1, it will be seen that the network environment 100 includes an image optimization server (IOS) 104 located in a cloud 106 and accessible via a network connection 108. As used herein, the term "cloud' refers to computing resources (software and hardware) configured to provide services over various network connections 108. In one embodiment, the cloud 106 may be a private cloud or it may be a public cloud. Moreover, the network connections 108 may include private or public network connections based on different networking protocols such as TCP/IP. In one embodiment, the network connections 108 may be through a wide-area network (WAN) such as the Internet.

In one embodiment, the IOS 104 may perform at various types of image optimizations to optimize images received from the camera 102 via the network connection 108 shown. These optimizations will be described later. In one embodiment, a video stream comprising the optimized images are sent or streamed to each of a plurality of video receivers 110 via corresponding network connections 108 as shown. Each video receiver 110 may include a capability for video playback. As such the receivers may be mobile phones, personal computers, television sets, tablet computing devices, etc.

Figure 2:
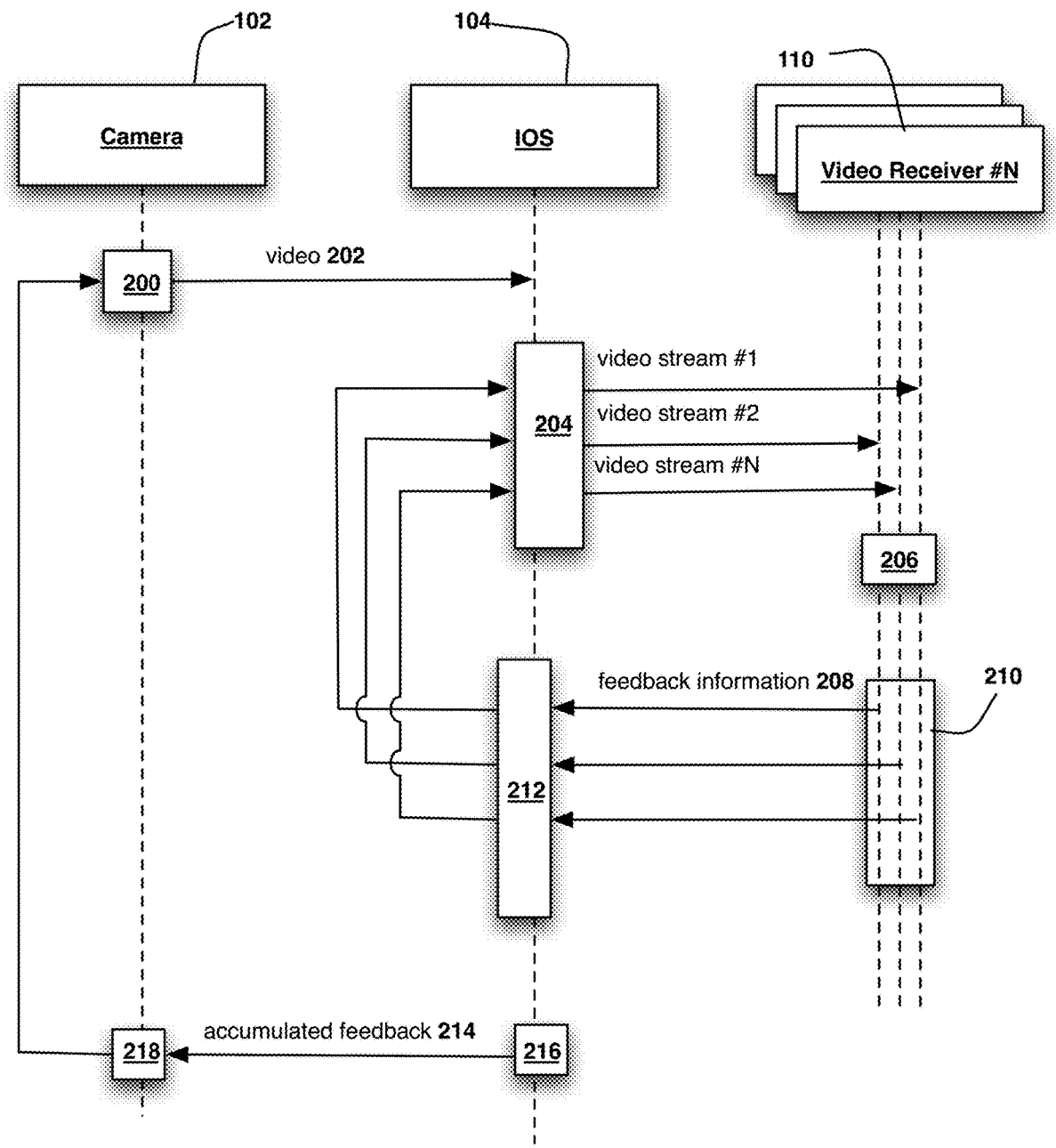
FIG. 2 shows the interactions between a camera, an image optimization server (IOS), and the various image receivers, in accordance with o one embodiment of the invention.

FIG. 2 shows the interactions between the camera 100, IOS 104, and the various receivers 110, in one embodiment. Referring to FIG. 2, at block 200, the camera 102, transmits video 202 to the IOS 104. Initially, the video that is transmitted is un-optimized. For example, in one embodiment, the video 202 may pertain to a meeting that is being video-conferenced. At block 204, the IOS 104, executes a process to transmit the video 202 received from the camera 102 to each of a plurality of video receivers 110, as N separate video streams. At this stage, each video stream N is streamed as un-optimized video, but this changes once the IOS 104 determines what optimizations to make, as will be described. At block 206, each receiver 110 receives a video stream N from the IOS 104 and proceeds to render it for viewing on a display thereof.

At block 206, each receiver 110 captures feedback information 208 indicative of what parts/locations of the video being shown at the receiver 110 is interesting or being viewed. In one embodiment, said feedback information 208 may include information based on zooming and panning operations performed at the receiver 110 responsive to user-input. At block 210, each receiver 110 transmits the feedback information 208 to the IOS 104.

In one embodiment, responsive to receiving the feedback information 208, at block 212, the IOS 104 optimizes the video for each viewer based on the feedback information 208. Said optimizations are referred to hereinafter as "cloud optimizations". Examples of some cloud optimizations are provided later. At block 204, the optimized video may be transmitted as a plurality of optimized video streams N to the video receivers 110.

In one embodiment, the IOS 104 may accumulate or aggregate the areas of video found to be interesting across the N video streams into accumulated feedback information 214. At block 216, said accumulated feedback information 214 may be transmitted to the camera 102 via the network connection 108. In response to receiving the accumulated feedback 214, in one embodiment the camera 104 perform "camera optimizations" to ensure that render higher quality video in those locations that are of interest to the viewers.

Examples of Camera Optimizations (a) In one embodiment, each frame is divided into smaller blocks. Each block is encoded using different modes such as inter (temporally predicted) or intra (spatially predicted). The blocks may be transformed into the frequency domain (using the discrete cosine transform (DCT) for AVC or h.264). Coefficients in the frequency domain may be sub-divided by a quantization parameter (QP). The QP may vary block to block across the frame (in AVC or h.264 the QP ranges from 0 to 51). The lower the QP, the higher the quality and more bits that are used and vice versa for higher QP. In one embodiment, a portion of the video may be transmitted with minimal bits (and therefore with little impact on available bandwidth). For instance a skip macroblock (MB) in AVC may have a derived motion vector and no coefficients and thus may require significantly less bits for transmission. There may be frames that require all intra (spatially predicted) blocks. For these frames, all the coefficients may be zeroed out to require few bits. A block that requires minimal bits for transmission is referred to herein as a "skipped macroblock."

In one embodiment, video captured by the camera 110 may be divided into blocks. The blocks that are being viewed are assigned a lower QP than the blocks that are not being viewed. Additionally, blocks viewed by multiple users may be given an even lower QP to render those regions in higher quality. Some encoders already use different QP for different blocks with respect to the spatial or temporal complexity of the scene. The information based on what is being viewed may also be used to offset those QP values to increase the importance of the details being viewed. As another example, consider the case where a user/viewer A is viewing the entire stream at 15 fps and a user B is viewing a subsection thereof at 30 fps. In this case, the local system or camera 104 can be configured to render video at 30 fps, and to skip every other frame in the stream outside the subsection being viewed by user B. Thus, advantageously, both users would get the highest quality video experience relative to the video rendering capability of their respective video receivers. In one embodiment, in order to make the video transmission efficient, the regions being sent at a lower frame rate would use skipped macroblocks. In another embodiment, if say a frame N is used for both users and frame N+1 only will be viewed by the user B at a higher frame rate, then for frame N+1, the portion of the video being viewed by the user B will be information from frame N+1. But the portion not being viewed by the user B, will duplicate the content from frame N. To transmit the duplicate content, the camera 110 may encode the video with a skip macroblock (MB) for all those regions. Thus, two consecutive frames would have identical content for a portion of the frame, with information outside the region being viewed by the high frame rate user B being skipped using a skip MB.

Figure 3A:
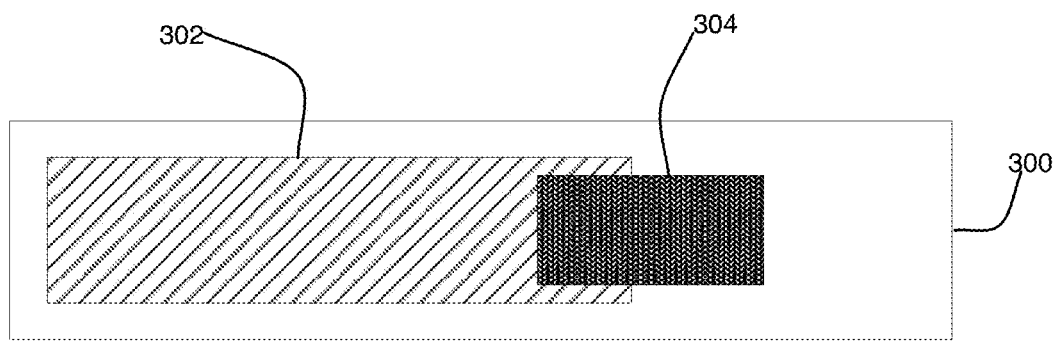
FIGS. 3A-B illustrates how bandwidth optimization may be performed, in accordance with one embodiment of the invention.
Figure 3B:

To make the video transmission efficient, the regions being skipped may be encoded as skipped macroblocks, as is shown in FIGS. 3A-B. Referring to FIG. 3A, reference numeral 300 generally indicates a panoramic video captured by the camera 102. Area 302 indicates a region of the panoramic video 300 viewed by the user A, in the above example, whereas area 304 indicates the region being viewed by the user B. FIG. 3B shows a portions of a video image sequence transmitted by the camera 102, in accordance with one embodiment, in order to optimize transmission bandwidth. For the user A, frames 308 and 310 of the video image sequence are transmitted, whereas for the user B frames 306-312 are transmitted. As will be seen the larger region for the user A is transmitted every even frame. Further, more bandwidth will be dedicated to the user B who receives every frame. Thus, the viewing experience is optimized for both viewers. The regions shown in black are still transmitted, but at a higher quantization parameter and/or as skipped macroblocks.

Figure 4:
FIGS. 4 and 5 illustrates the images received by User A and User B respectively, in accordance with one embodiment of the invention.
Figure 4:
Figure 5:
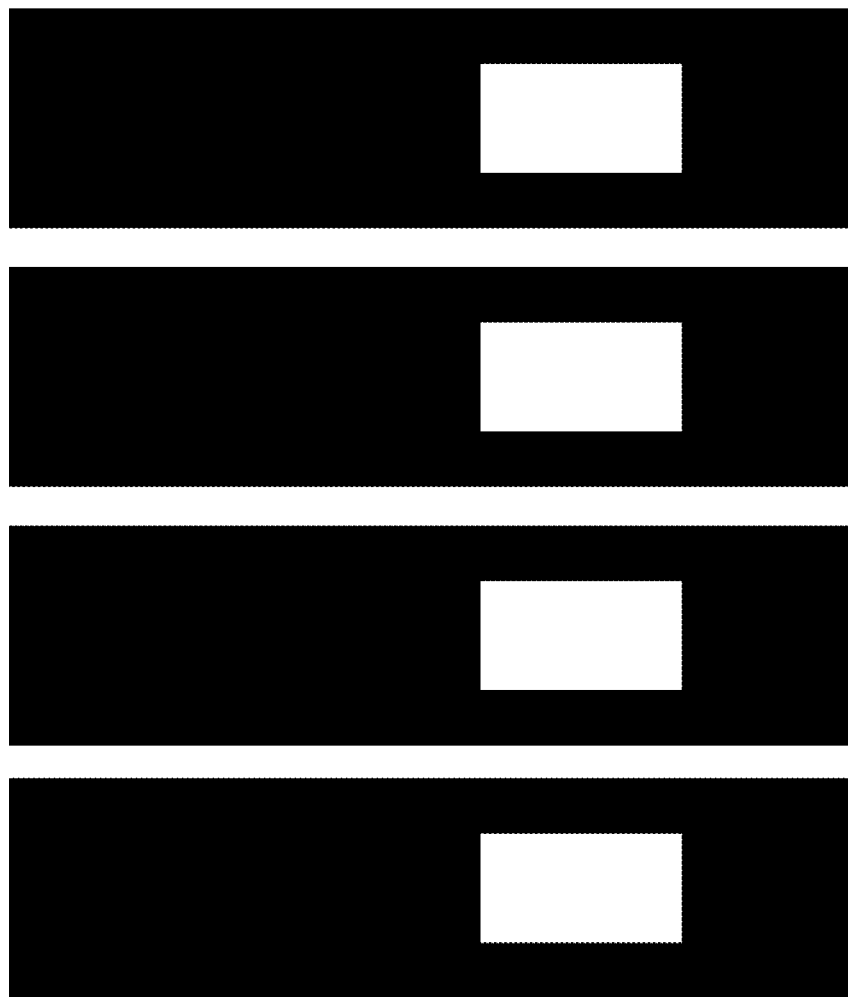

In one embodiment, the video image sequence is sent to the IOS 104. The IOS 104 may separate the streams into an optimized stream for each viewer. In the above, the first and third frames may be sent to the user A, whereas the user B receives all four frames. In one embodiment, more bits are used to encode the white portion of each frame compared to the portions shown in black. FIG. 4 shows the images received by the User A, whereas FIG. 5 shows the images received by the User B.

Examples of Cloud Optimizations

Figure 6:
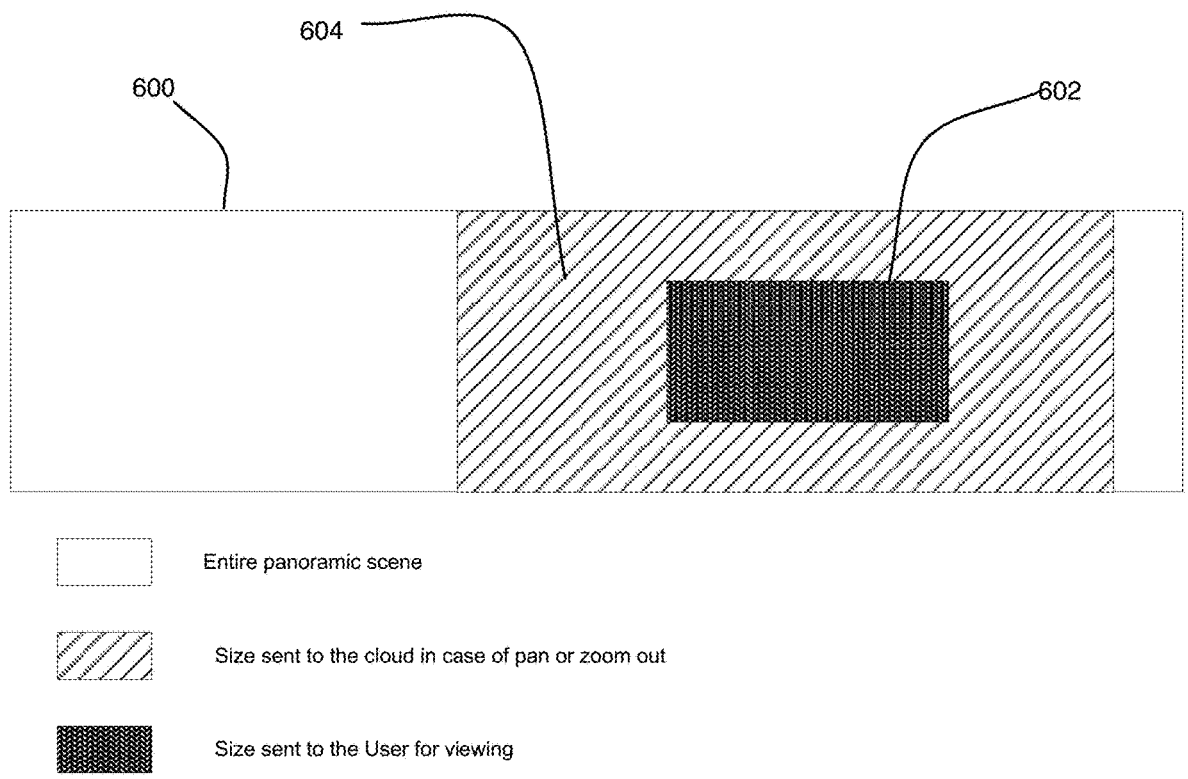
FIG. 6 illustrates a pre-rendering method, in accordance with one embodiment of the invention.

In one embodiment, the IOS 104 may pre-render certain areas of video in order to reduce latency. For example the IOS 104 or, in some embodiments the receivers 110 may determine that a first region currently being rendered is of sufficient quality, in which case larger a second region proximally related to the first region may be pre-rendered by the IOS 104 ahead of time (i.e. prior to the viewer indicating an interest to view said second region). In one embodiment, responsive to the act of the viewer panning or viewing another section of a video stream located in the second region, the IOS 104 may encode that section since it was already sent by the to the IOS 104 by the camera 102. This pre-rendering advantageously optimizes the available bandwidth to give a higher quality experience with very low latency. FIG. 6 of the drawings illustrates how pre-rendering works, in accordance with one embodiment. Referring to FIG. 4 reference numeral 600 indicates a panoramic scene. Reference numeral 602 indicates a first region in the scene 600 corresponding to a first region that is currently being rendered and viewed on a video receiver 110. If the region 402 is being rendered at a sufficiently high quality, then in one embodiment, the IOS 104 may signal the camera 104 to transmit the larger region 604 to it using the available bandwidth and without compromising the video quality of the region 602. Without, the viewer knowing, the IOS 104 pre-renders the larger region 6-4 and waits for panning and zooming information in the form or feedback information 208 from the video receiver 110. If the feedback information indicates that the viewer is interested in viewing a section within the area 404, then the section can be streamed to the video receiver 110 with low latency as said section has already been pre-rendered by the IOS 104.

The IOS 104 may determine area 602 is of sufficient quality by the quantization parameter being used to encode that region. In another embodiment, the receiving device may send statistical feedback to correspond with how detailed the viewed region 602 is. The IOS then compares that statistical feedback with statistics derived from the pre-encoded frame. The tradeoff between improving the region 604 is adjusted relative to the similarity between the two sets of statistics.

Figure 7:
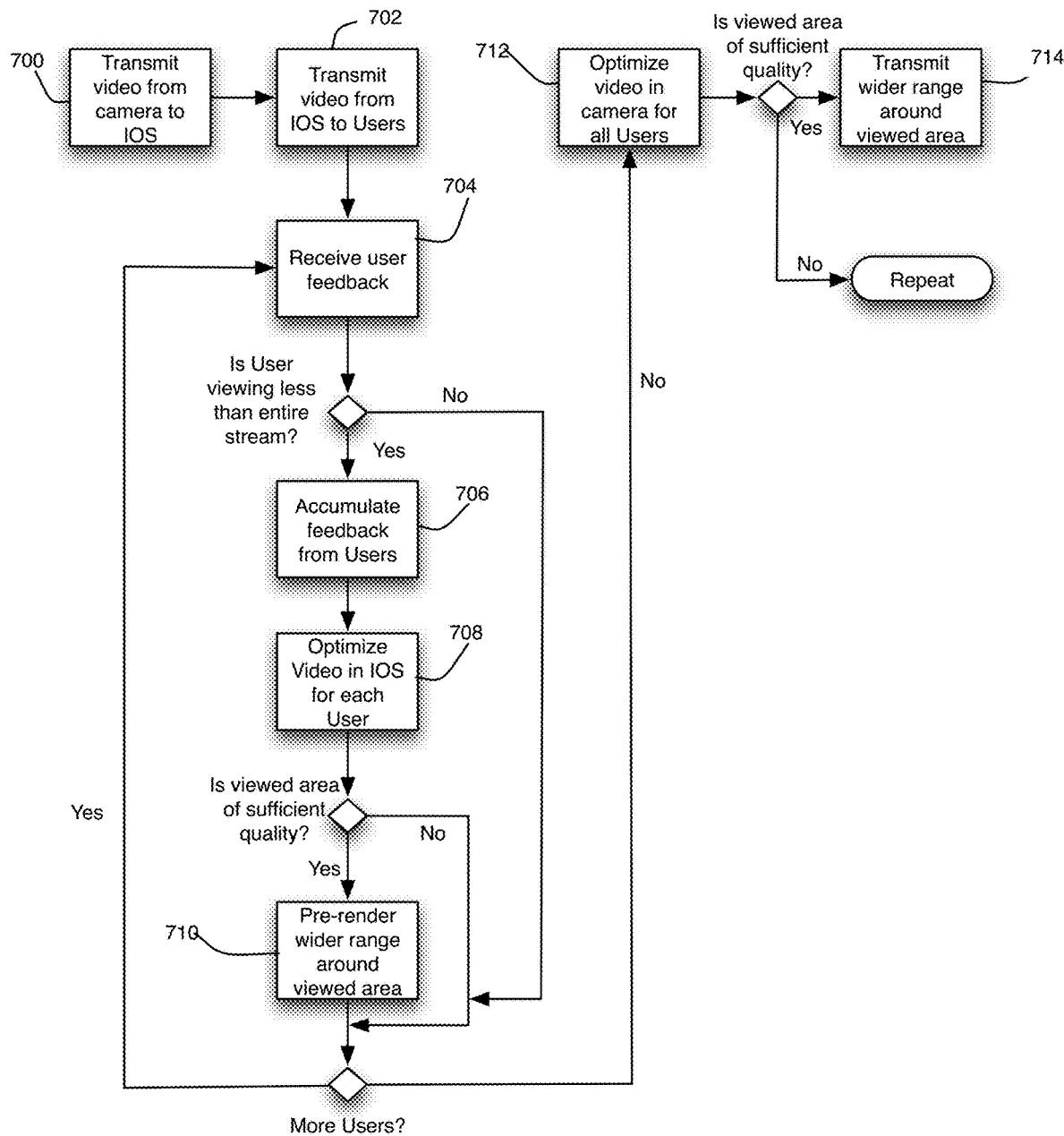
FIG. 7 illustrates an image optimization technique, in accordance with one embodiment of the invention.

Referring now to FIG. 7 of the drawings, there is shown a flowchart for video stream optimization in accordance with one embodiment of the invention. Starting a block 700, video is transmitted from the camera 102 to the IOS 104. At block 702, the IOS 104 transmits the video in the form of a plurality of video streams, each stream N to a video receiver 114. At block 704, the IOS 104 receives user feedback from each device 114. The feedback may indicate areas of each video of interest to each viewer, as discussed above. At block 706, the IOS accumulates the user feedback. At block, 708 the video stream for each viewer may be optimized based on the accumulated feedback by the IOS 104. At block 710, a wider or larger area may be pre-rendered as discussed above. At block 710, the camera 104 may optimize the video for all users, as discussed above. At block 714, the optimized video is transmitted to the IOS 104.

Figure 8:
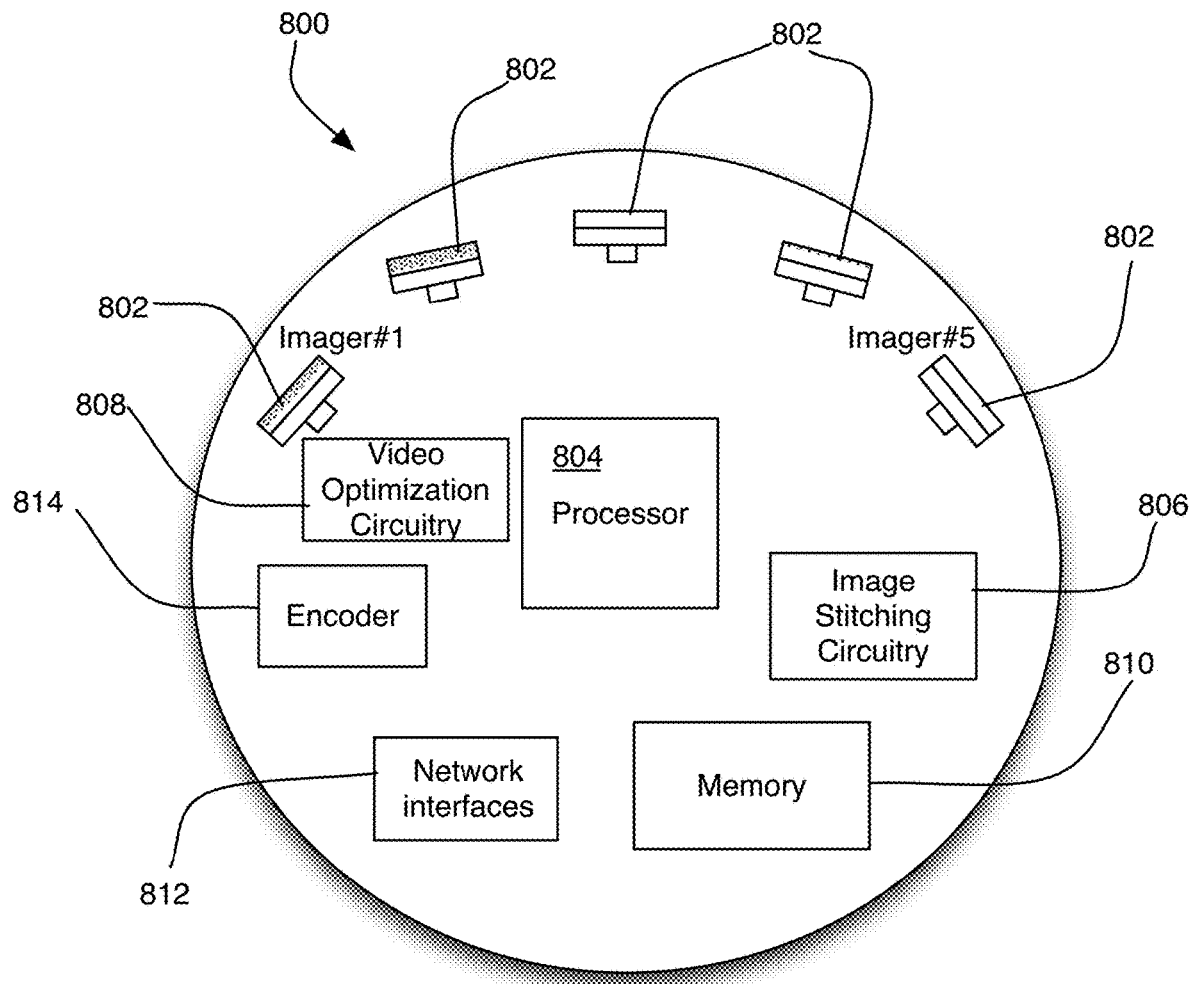
FIG. 8 shows a high-level block diagram of hardware for a video camera, in accordance with one embodiment of the invention.

FIG. 8 illustrates an example embodiment of hardware 800 corresponding to the camera 102. The system 800 includes multiple imagers/sensors 802 mounted along an arc such that each imager 802 is directed to capture a portion of a scene. Each imager 802 may include suitable sensors, for example charge-coupled device (CCD) or complimentary metal-oxide semiconductor (CMOS) imaging sensors, as is known in the art.

The system 800 also includes logic/processor 804, image stitching circuitry 806, video optimization circuitry 808, memory 810, one or more network interfaces 812, and an encoder 814. In one embodiment, digital signals recorded by the sensors 802 are sent to the logic/processor 804 for processing. In one embodiment, the logic/processor 804 may execute programs for implementing image processing functions and calibration functions, as well as for controlling the operation of the entire device 800 including its image capture operations. Optionally, the logic/processor 804 may include signal processing functionality for performing image processing, including image filtering, enhancement and for combining multiple fields of view in cooperation with the image stitching circuitry 806 and the video optimization circuitry 808. Although shown separately, in some embodiments, the image stitching circuitry 806 and the video optimization circuitry 808 may exist as part of the logic/processor 804. It is to be understood that components of the device 800 may take the form of hardware, software, firmware, or any combination of hardware, software, and firmware.

Digital signals representing a panoramic view may be stored in the memory 810. The encoder 814 may compress digital signal before transmission across via a network interface 812. The network interfaces 812 may be configured to provide network connectivity to the device 800. As such, the network interfaces 812 may include wireless and wired interfaces, in accordance with different embodiments. Accordingly, embodiments of the present invention disclose techniques for performing cloud-based optimizations in respect of images generated by the camera 800 in real time.

Figure 9:
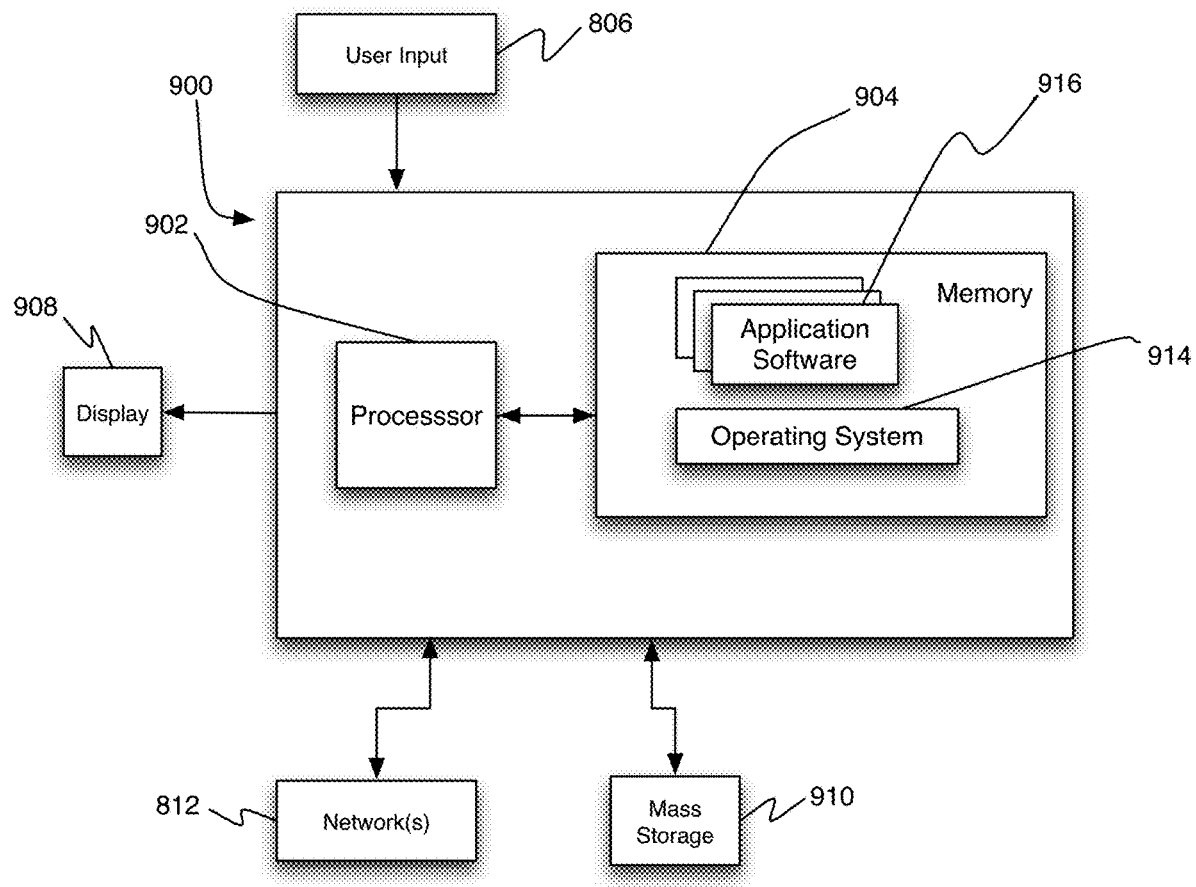
FIG. 9 shows a high-level block diagram of hardware for an image optimization server, in accordance with one embodiment of the invention.

FIG. 9 shows an example of hardware 900 that may be used to implement the IOS 104, in accordance with one embodiment. The hardware 900 typically includes at least one processor 902 coupled to a memory 904. The processor 902 may represent one or more processors (e.g., microprocessors), and the memory 704 may represent random access memory (RAM) devices comprising a main storage of the hardware 900, as well as any supplemental levels of memory e.g., cache memories, non-volatile or back-up memories (e.g. programmable or flash memories), read-only memories, etc. In addition, the memory 904 may be considered to include memory storage physically located elsewhere in the hardware 900, e.g. any cache memory in the processor 902, as well as any storage capacity used as a virtual memory, e.g., as stored on a mass storage device 910.

The hardware 900 also typically receives a number of inputs and outputs for communicating information externally. For interface with a user or operator, the hardware 900 may include one or more user input devices 906 (e.g., a keyboard, a mouse, a scanner etc.) and a display 908 (e.g., a Liquid Crystal Display (LCD) panel). For additional storage, the hardware 900 may also include one or more mass storage devices 910, e.g., a floppy or other removable disk drive, a hard disk drive, a Direct Access Storage Device (DASD), an optical drive (e.g. a Compact Disk (CD) drive, a Digital Versatile Disk (DVD) drive, etc.) and/or a tape drive, among others. Furthermore, the hardware 700 may include an interface with one or more networks 912 (e.g., a local area network (LAN), a wide area network (WAN), a wireless network, and/or the Internet among others) to permit the communication of information with other computers coupled to the networks. It should be appreciated that the hardware 900 typically includes suitable analog and/or digital interfaces between the processor 902 and each of the components 904, 906, 908 and 912 as is well known in the art. The hardware 900 operates under the control of an operating system 914, and executes various computer software applications, components, programs, objects, modules, etc. indicated collectively by reference numeral 916 to perform the techniques described above.

In general, the routines executed to implement the embodiments of the invention, may be implemented as part of an operating system or a specific application, component, program, object, module or sequence of instructions referred to as "computer programs." The computer programs typically comprise one or more instructions set at various times in various memory and storage devices in a computer, and that, when read and executed by one or more processors in a computer, cause the computer to perform operations necessary to execute elements involving the various aspects of the invention. Moreover, while the invention has been described in the context of fully functioning computers and computer systems, those skilled in the art will appreciate that the various embodiments of the invention are capable of being distributed as a program product in a variety of forms, and that the invention applies equally regardless of the particular type of machine or computer-readable media used to actually effect the distribution. Examples of computer-readable media may include, but are not limited to, recordable type media, e.g. volatile and non-volatile memory devices, floppy and other removable disks, hard disk drives, optical disk (e.g., Compact Disk Read-Only Memory (CD ROMS), Digital Versatile Disks, (DVDs), etc.), flash drives among others.

Numerous specific details may be set forth herein to provide a thorough understanding of a number of possible embodiments of a digital imaging system incorporating the present disclosure. It will be understood by those skilled in the art, however, that the embodiments may be practiced without these specific details. In other instances, well-known methods, procedures, components and circuits have not been described in detail so as not to obscure the embodiments. It can be appreciated that the specific structural and functional details disclosed herein may be representative and do not necessarily limit the scope of the embodiments.

The method of the present invention may be performed either in hardware, software, or any combination thereof, as those terms are currently known in the art. In particular, the present method may be carried out by software, firmware, or microcode operating on a computer or computers of any type, including preexisting or already-installed image processing facilities capable of supporting any or all of the processor's functions. Additionally, software embodying the present invention may comprise computer instructions in any form (e.g., source code, object code, interpreted code, etc.) stored in any computer-readable medium (e.g., ROM, RAM, magnetic media, punched tape or card, compact disc (CD) in any form, DVD, etc.). Furthermore, such software may also be in the form of a computer data signal embodied in a carrier wave, such as that found within the well-known Web pages transferred among devices connected to the Internet. Accordingly, the present invention is not limited to any particular platform, unless specifically stated otherwise in the present disclosure.

Although the invention is described above in terms of various exemplary embodiments and implementations, it should be understood that the various features, aspects and functionality described in one or more of the individual embodiments are not limited in their applicability to the particular embodiment with which they are described, but instead can be applied, alone or in various combinations, to one or more of the other embodiments of the invention, whether or not such embodiments are described and whether or not such features are presented as being a part of a described embodiment. Thus, the breadth and scope of the present invention should not be limited by any of the above-described exemplary embodiments.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

The presence of broadening words and phrases such as "one or more," "at least," "but not limited to" or other like phrases in some instances shall not be read to mean that the narrower case is intended or required in instances where such broadening phrases may be absent. The use of the term "module" does not imply that the components or functionality described or claimed as part of the module are all configured in a common package. Indeed, any or all of the various components of a module, whether control logic or other components, can be combined in a single package or separately maintained and can further be distributed in multiple groupings or packages or across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

The invention claimed is:

1. A computer-implemented method for transmitting a panoramic video from a camera to a plurality of video receivers, comprising:
    receiving the panoramic video from the camera corresponding to a scene being imaged;

transmitting the panoramic video as a plurality of video streams, each to one of the plurality of video receivers;

receiving feedback information from at least one of the plurality of video receivers, wherein said feedback information comprises information defining at least one region of interest in the panoramic video unique to each of the plurality of video receivers, wherein the feedback information further comprises information based on at least one of a zooming operation or a panning operation performed at any of the plurality of video receivers; and performing an optimization operation to optimize the panoramic video being transmitted based on the feedback information received, wherein said optimization operation comprises pre-rendering a second region of the panoramic video before the second region is requested for viewing on the video receiver, wherein the second region is proximally related to the first region, wherein the optimization operation comprises optimizing a portion currently being viewed at each of the plurality of video receivers by dividing each frame of the portion currently being viewed into a plurality of blocks and encoding each block based on spatial prediction or temporal prediction.

2. The method of claim 1, further comprising aggregating the feedback information received from each video receiver to form aggregated feedback information; and transmitting the aggregated feedback information to the camera.

3. The method of claim 2, further comprising determining a portion of a scene currently being viewed at each video receiver based on the feedback information from the video receiver.

4. The method of claim 3, wherein said optimization operation comprises optimizing the portion currently being viewed at each receiver selectively based on a frame rate associated with the video receiver.

5. The method of claim 3, wherein said optimization comprises optimizing the portion currently being viewed at each receiver selectively by pre-rendering portions of the scene surrounding the portion currently being viewed.

6. The method of claim 3, wherein said optimization comprises optimizing the portion currently being viewed at each receiver selectively based on available transmission bandwidth associated with the receiver.

7. A system for transmitting a panoramic video from a source to a plurality of video receivers, comprising:

a multi-imager camera to transmit the panoramic video corresponding to a scene; and a server located in a cloud to receive and transmit the panoramic video as a plurality of video streams, each to one of the plurality of video receivers, wherein the server is configured to receive feedback information from at least one of the plurality of video receivers, wherein said feedback information comprises information defining at least one region of interest in the panoramic video unique to each of the plurality of video receivers; and currently being viewed on the video receiver, wherein the feedback information further comprises information based on at least one of a zooming operation or a panning operation performed at any of the plurality of video receivers; and at least one of the camera and the server is configured to perform an optimization operation to optimize the panoramic video being transmitted based on the feedback information received, wherein said optimization operation comprises pre-rendering a second region of the panoramic video before the second region is requested for viewing on the video receiver, wherein said second region is proximally related to the first region, and wherein the optimization operation comprises optimizing a portion currently being viewed at each of the plurality of video receivers by dividing each frame of the portion currently being viewed into a plurality of blocks and encoding each block based on spatial prediction or temporal prediction.

8. The system of claim 7, wherein the server aggregates the feedback information received from each video receiver to form aggregated feedback information; and transmits the aggregated feedback information to the multi-imager camera.

9. The system of claim 8, wherein at least one of the camera and the server determines a portion of the scene currently being viewed at each video receiver based on the feedback information from the video receiver.

10. The system of claim 8, wherein said optimization operation comprises optimizing the portion currently being viewed at each receiver selectively based on a frame rate associated with the video receiver.

11. The system of claim 8, wherein said optimization comprises optimizing the portion currently being viewed at each receiver selectively by pre-rendering portions of the scene surrounding the portion currently being viewed.

12. The system of claim 8, wherein said optimization comprises optimizing the portion currently being viewed at each receiver selectively based on available transmission bandwidth associated with the receiver.

13. A non-transitory computer-readable medium having stored thereon a sequence of instructions which when executed by a system causes the system to perform a method for transmitting a panoramic video from a source to a plurality of video receivers, said method, comprising:

receiving the panoramic video corresponding to a scene being imaged;

transmitting the panoramic video as a plurality of video streams, each to one of the plurality of video receivers;

receiving feedback information from at least one of the plurality of video receivers, wherein said feedback information comprises information defining at least one region of interest in the panoramic video unique to each of the plurality of video receivers, wherein the feedback information further comprises information based on at least one of a zooming operation or a panning operation performed at any of the plurality of video receivers; and performing an optimization operation to optimize the panoramic video being transmitted based on the feedback information received, wherein said optimization operation comprises pre-rendering a second region of the panoramic video before the second region is requested for viewing on the video receiver, wherein the second region is proximally related to the first region, wherein the optimization operation comprises optimizing a portion currently being viewed at each of the plurality of video receivers by dividing each frame of the portion currently being viewed into a plurality of blocks and encoding each block based on spatial prediction or temporal prediction.

14. The computer-readable medium of claim 13, wherein the method further comprises aggregating the feedback information received from each video receiver to form aggregated feedback information; and transmitting the aggregated feedback information to the camera.

15. The computer-readable medium of claim 13, wherein the method further comprises determining a portion of the scene currently being viewed at each video receiver based on the feedback information from the video receiver.

16. The computer-readable medium of claim 13, wherein said optimization operation comprises optimizing the portion currently being viewed at each receiver selectively based on a frame rate associated with the video receiver.

17. The computer-readable medium of claim 13, wherein said optimization comprises optimizing the portion currently being viewed at each receiver selectively by pre-rendering portions of the scene surrounding the portion currently being viewed.

\* \* \* \* \*